(12) United States Patent
Havrda

(10) Patent No.: US 7,510,355 B2
(45) Date of Patent: Mar. 31, 2009

(54) CUTTING TOOL, PARTICULARLY FOR END-CUT AND LONGITUDINAL TURNING AND FOR GROOVE CUTTING

(75) Inventor: Franz Havrda, Grossenseebach (DE)

(73) Assignee: Kennametal Inc., Latrobe, PA (US)

(*) Notice: Subject to any disclaimer, the term of this patent is extended or adjusted under 35 U.S.C. 154(b) by 253 days.

(21) Appl. No.: 11/277,442

(22) Filed: Mar. 24, 2006

(65) Prior Publication Data

US 2006/0269367 A1    Nov. 30, 2006

Related U.S. Application Data

(63) Continuation-in-part of application No. PCT/EP2004/010588, filed on Sep. 22, 2004.

(30) Foreign Application Priority Data

Sep. 27, 2003    (DE) .................. 103 44 961

(51) Int. Cl.
*B23B 27/22* (2006.01)
(52) U.S. Cl. .................. 407/116; 407/115; 407/117
(58) Field of Classification Search .................. 407/110, 407/113–117
See application file for complete search history.

(56) References Cited

U.S. PATENT DOCUMENTS

| | | | | |
|---|---|---|---|---|
| 3,395,434 A * | 8/1968 | Wirfelt | ........... | 407/114 |
| 3,815,191 A * | 6/1974 | Holma | ........... | 407/114 |
| 4,969,779 A * | 11/1990 | Barten | ........... | 407/114 |
| 5,096,338 A * | 3/1992 | Takahashi | ........... | 407/114 |
| 5,511,911 A * | 4/1996 | Katbi et al. | ........... | 407/114 |
| 5,676,495 A * | 10/1997 | Katbi et al. | ........... | 407/114 |
| 5,725,334 A * | 3/1998 | Paya | ........... | 407/117 |
| 5,743,681 A * | 4/1998 | Wiman et al. | ........... | 407/114 |
| 5,975,812 A * | 11/1999 | Friedman | ........... | 407/114 |
| 6,135,678 A * | 10/2000 | Lundstrom et al. | ........... | 407/117 |
| 2003/0170081 A1 * | 9/2003 | Andersson et al. | ........... | 407/114 |

FOREIGN PATENT DOCUMENTS

| DE | 29503246 U1 | 4/1995 |
|---|---|---|
| EP | 0568512 A | 11/1993 |
| JP | 02106204 A | 7/1990 |

* cited by examiner

*Primary Examiner*—Boyer D Ashley
*Assistant Examiner*—Sara Addisu
(74) *Attorney, Agent, or Firm*—Larry R. Meenan

(57) ABSTRACT

Cutting tool, such as for end-cut and longitudinal turning, and for cutting grooves in a workpiece, which has an end or major cutting edge and two side or minor cutting edges, each of which are connected to the end or major cutting edge by two outer corners. Additional corner chip-breakers are formed between each of the outer corners and the ends of a chip-guiding rib.

12 Claims, 8 Drawing Sheets

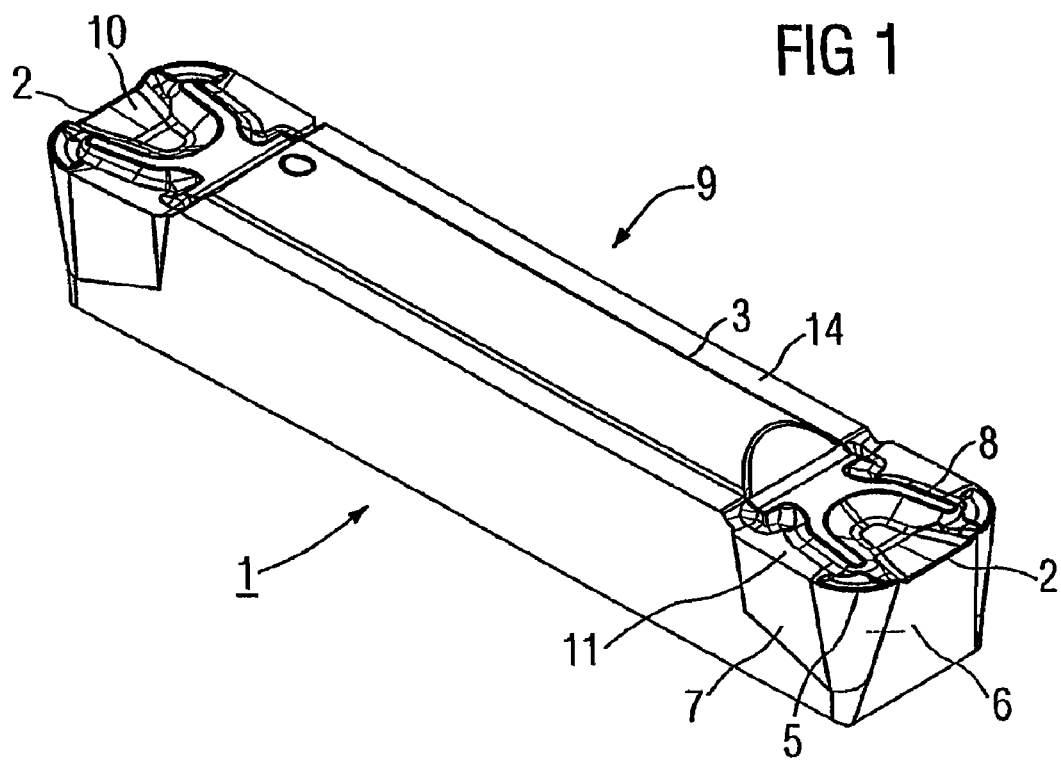
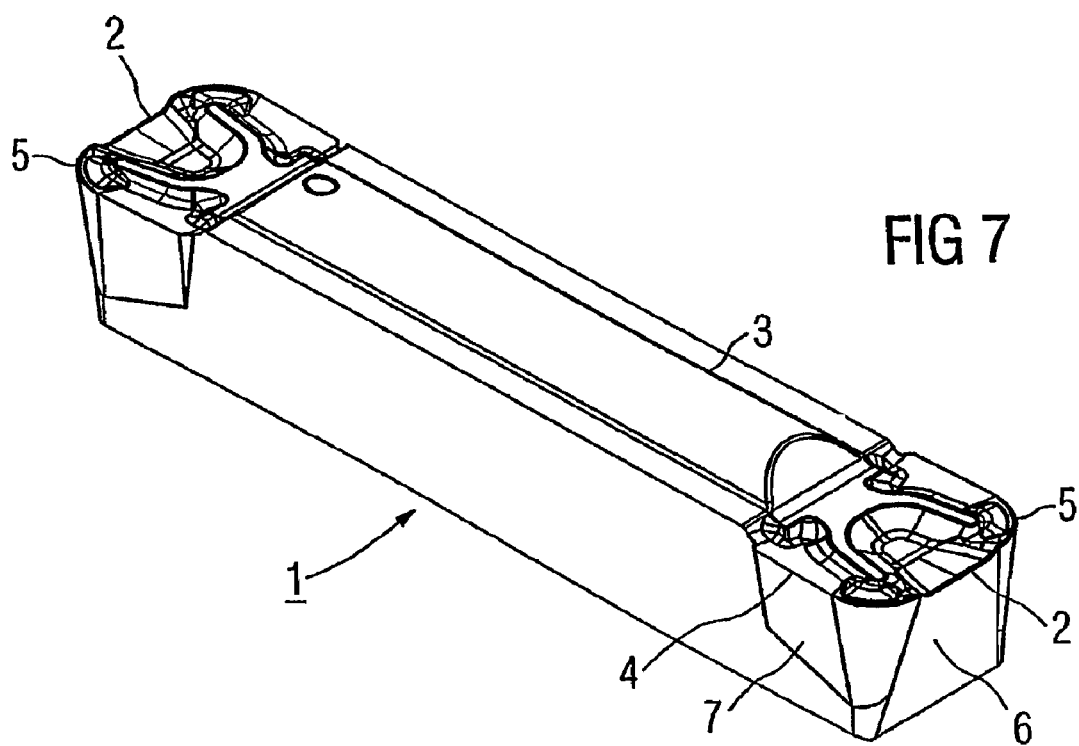

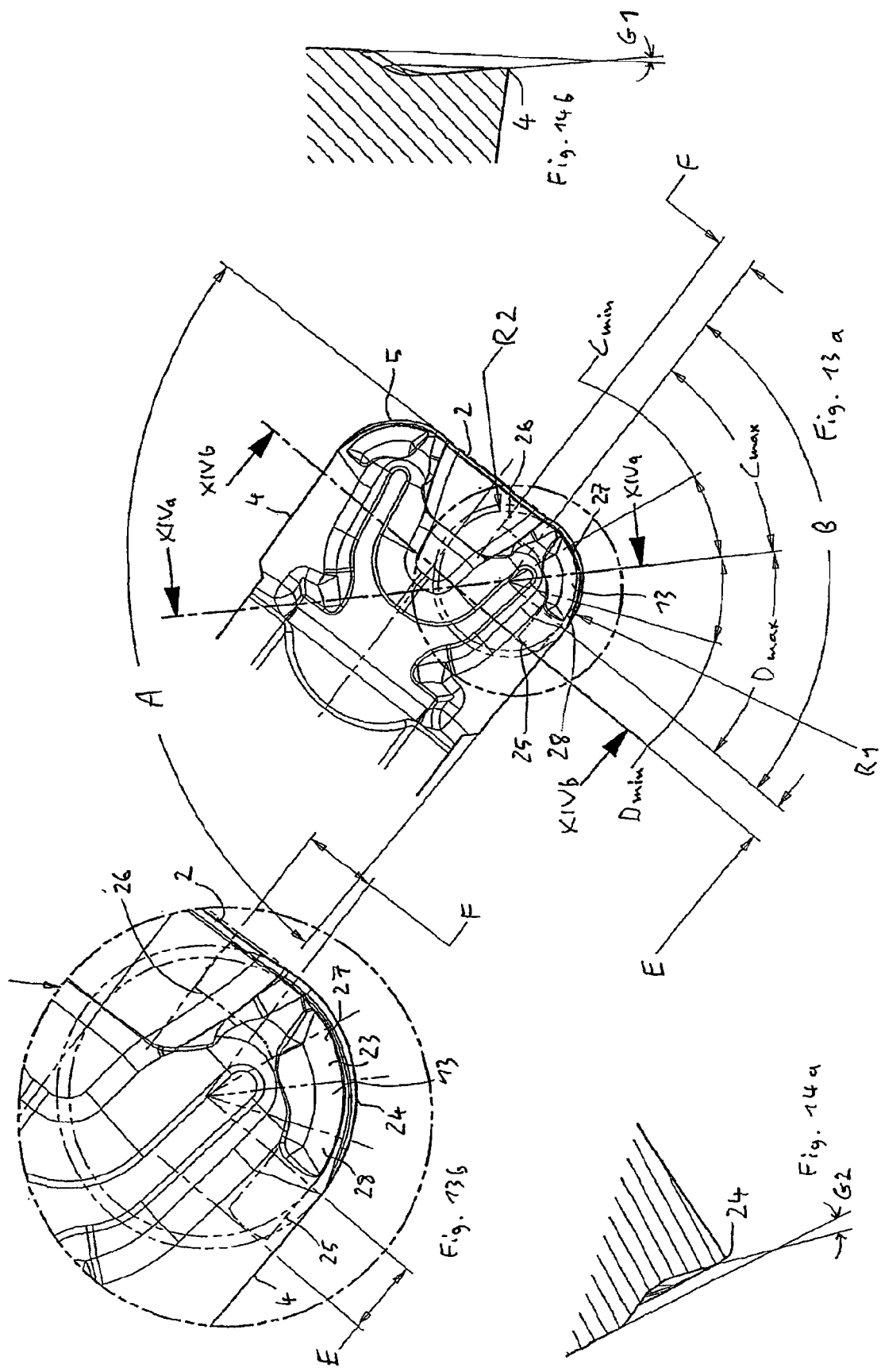

CUTTING TOOL, PARTICULARLY FOR END-CUT AND LONGITUDINAL TURNING AND FOR GROOVE CUTTING

CONTINUING APPLICATION DATA

This application is a Continuation-In-Part application of International Patent Application No. PCT/EP2004/010588, filed on Sep. 22, 2004, which claims priority from Federal Republic of Germany Patent Application No. 103 44 961.2, filed on Sep. 27, 2003. International Patent Application No. PCT/EP2004/010588 was pending as of the filing date of this application. The United States was an elected state in International Patent Application No. PCT/EP2004/010588.

BACKGROUND

1. Technical Field

The present application relates to a cutting tool, particularly for end-cut and longitudinal turning, with one major cutting edge and two minor cutting edges, wherein a chip space is attached to each cutting edge, and with a curved chip-guiding rib that borders on the chip spaces and whose curve opening faces the major cutting edge. Such a cutting tool is known, for example, from DE 295 03 246 U1. The application also relates to a groove cutting tool for cutting grooves in a workpiece, which groove cutting tool has an end cutting edge and two side cutting edges.

2. Background Information

Additional cutting tools that are realized for end-cut and longitudinal turning are described, for example, in JP 02106204 A, U.S. Pat. No. 5,676,495 and EP 0 568 512 A1. All of these cutting tools have an approximately curved chip-guiding rib. In the configuration described by JP 02106204, the curved shape is created by sub-segments that are oriented at an angle to one another.

In the case of such a tool type known from DE 295 03 246 U1, during end-cut turning, the major cutting edge is used for material removal, and, during longitudinal turning, one of the minor cutting edges is used. During end-cut turning, the chip formation occurs mainly through the inside of the curved chip-guiding rib, and, during longitudinal turning, primarily through the outside of the chip-guiding rib. It is particularly problematic to design the chip-guiding rib equally for both end-cut and longitudinal turning operations.

OBJECT OR OBJECTS

The task of the present application is to specify a cutting tool with a chip-guiding geometry that is particularly suitable for both end-cut and longitudinal turning, as well as for cutting grooves in a workpiece.

SUMMARY

This problem is solved according to the present application by a cutting tool with the features described herein below. This cutting tool intended for end-cut and longitudinal turning has one major cutting edge, two minor cutting edges connected to the major edge, and one curved chip-guiding rib. Curved chip-guiding ribs are hereby understood to include also those chip-guiding ribs that have a V-shape opening in the direction of the major cutting edge. Chip spaces are formed each time between the chip-guiding rib and the individual cutting edges, namely, an end-cut chip space is formed at the major cutting edge, and longitudinal-turning chip spaces at the minor cutting edges. Additionally, corner chip-breakers are provided in the area of the outer corners between the major cutting edge and the minor cutting edges. The corner chip-breakers are hereby located between the outer corners and the ends of the U-shaped, V-shaped, or curved chip-guiding ribs that face them. The corner chip-breakers are designed either as a chip-breaking trough, a chip-breaking high spot, or a combination of a depression and a high spot in the surface of the cutting tool. By means of the corner chip-breakers, a defined chip-breaking formation is provided also in the area of the outer corner, which is in contact with the workpiece during both end-cut and longitudinal turning. By arranging the corner chip-breakers between the ends of the chip-guiding rib, which face the outer corners, and the outer corners, i.e., positioned particularly close to the outer corners, the cutting tool is also particularly suitable for the machining off of very small allowances.

In one preferred embodiment, the corner chip-breaker is curved, with the opening of the curve facing the neighboring end of the chip guiding rib. In this case, the corner chip-breaker has a curved segment, the outside radius of which is preferably a minimum of 80% and a maximum of 95% of the radius of the corner cutting edge that connects a minor cutting edge with the major cutting edge. The curved segment can be in mirror symmetry to a bisecting line of the angle between the major cutting edge and the minor cutting edge. In one preferred embodiment, however, the curved segment departs from such a symmetrical shape at least slightly. Seamlessly adjacent to a first chip-breaker segment of the curved segment that faces the major cutting edge is a second chip-breaker segment that faces one of the minor cutting edges, whereby the width of the curved segment of the chip-breaker, measured perpendicular to the respective neighboring cutting edge, decreases from the first chip-breaker segment to the second chip-breaker segment. Each of the chip breaker segments preferably extends over an angle that is a minimum of one-quarter and a maximum of one-half of the angle described by the corner cutting edge. The overall curved segment of the chip-breaker thereby extends at a maximum over the angle that is formed between the major cutting edge and a minor cutting edge, i.e. over the angle described by the corner cutting edge. The curved segment of the corner chip-breaker extends over at least one-half of the angle described by the corner cutting edge.

In one preferred development, the corner chip-breaker has a first linear segment that is contiguous to the curved segment and extends in the direction of a minor cutting edge, and a second linear segment that is also contiguous to the curved segment and extends in the direction of the major cutting edge, whereby the length of each linear segment is a maximum of one-half of the outside radius of the corner chip-breaker.

The cutting tool defines a plane, the position of which is determined essentially by the position of the major and minor cutting edges. In the case of an approximately square configuration of the cutting tool with two major cutting edges located on opposite sides when viewed from overhead, both major cutting edges lie in this plane or are at the same distance from it. The plane thereby describes, at least approximately, the position of the cutting faces, both the at least one major cutting edge as well as the at least two minor cutting edges. The angle enclosed by the surface of the corner chip-breaker with the above-mentioned plane is called the flank angle.

If the plane encloses a right angle with the surface of the workpiece to be processed, the flank angle is the same as the cutting angle.

In the vicinity of the curved segment, the corner chip-breaker preferably has a flank angle that is a minimum of 1.5 times and a maximum of twice the flank angle in the vicinity of a linear segment. The corner chip-breaker is thereby contoured particularly deeply in the middle of the area next to the corner cutting edge, i.e. on the cutting corner between the major and minor cutting edges. This configuration supports the special ability of the cutting tool both for end-cut and for longitudinal turning.

The major cutting edge is preferably formed in such a way that a central section of the major cutting edge, arranged between the ends of the chip-guiding rib, is recessed in relation to the outer corners. Thus, during end-cut turning, if there is a clearance angle larger than zero, the central section comes into contact with the workpiece only after the outer corners. The chip-breaking at the corner chip-breakers begins already before the chip-breaking by the chip-guiding rib. Each corner chip-breaker is preferably dimensioned to be smaller in all directions, or at least not larger, than the chip-guiding rib. In particular, the height of the corner chip-breaker, i.e., its extension perpendicular to the cutting edges, is not greater than the height of the chip-guiding rib, wherein the chip-guiding rib does not necessarily have a constant height but, rather, for example, has a height that decreases in the direction of the major cutting edge. Furthermore, the height of the corner chip-breaker is preferably less than the recess of the central section of the major cutting edge. The width of the corner chip-breaker, i.e., its expansion in the direction of extension of the major cutting edge, preferably amounts to at least 15%, and a maximum of 30%, of the width of the major cutting edge.

In the preferred embodiment, the cutting tool has a clamping rib that runs at a right angle to the major cutting edge and to which lateral flat surface areas are attached that are raised in relation to both the chip spaces and the chip-guiding rib. The aforementioned flat surface areas always verge on a stage on a minor cutting edge, wherein this stage can also be used as the chip curler. While this advantageously provides a stage between the longitudinal-turning chip space and the adjoining flat surface, there should be greater distance between the longitudinal-turning chip space and the clamping rib, which is positioned high when compared to the chip-guiding rib, wherein a chip that is formed at the minor cutting edge should particularly not be guided directly to the clamping rib without prior chip-breaking. This is preferably achieved by a cross rib that is connected to the chip-guiding rib on the side facing away from the major cutting edge. This cross rib is preferably wider than the clamping rib, but it does not completely fill the space between the two opposing minor cutting edges. The height of the cross rib preferably corresponds, at least in the area adjoining the chip-guiding rib, to the height of the chip-guiding rib in the same area, i.e., the cross rib attaches flush to the chip-guiding rib. Similar to the chip-guiding rib, the cross rib also does not necessarily have a constant height, but rather increases, for example, in the direction of the clamping rib.

The advantage of the embodiments lies especially in the fact that, by combining a curved chip-guiding rib with corner chip-breakers offset by this rib, intentional chip-breaking is insured during end-cut-turning and longitudinal-turning processes largely independently of the cut depth.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Two embodiments are explained below in more detail using the drawings. Shown herein are:

FIG. 1 shows an initial embodiment of a cutting tool in a perspective view;

FIG. 7 shows a second embodiment of a cutting tool in a perspective view;

FIGS. 13a and 13b show details in an overhead view of an additional exemplary embodiment of a cutting tool; and FIGS. 14a and 14b each show a section of the cutting tool illustrated in FIGS. 13a and 13b.

DESCRIPTION OF EMBODIMENT OR EMBODIMENTS

Figure 2A:
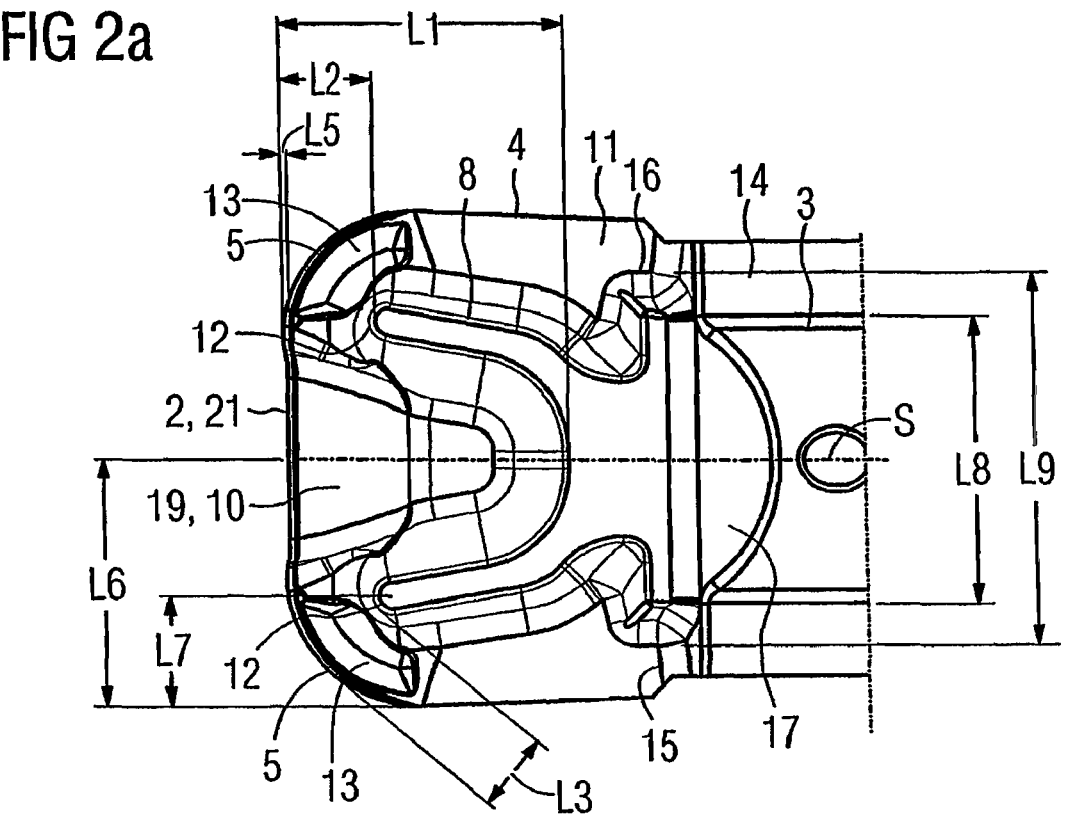
FIGS. 2a and 2b show a partial top view onto the cutting tool according to FIG. 1.

Parts that correspond to one another or that act equally are labeled with the same reference marks in all figures.

A cutting tool 1 shown in FIG. 1 is planned as a material removal tool for end-cut and longitudinal turning and is essentially designed mirror-symmetrically in the basic shape of a long, extended block with two major or end cutting edges 2 arranged on its narrow sides. A clamping rib 3 serves to clamp the cutting tool 1 that is made, for example, out of coated or non-coated hard metal. On each major cutting edge 2, two minor or side cutting edges 4 are always connected to one outer corner 5. Connected to the cutting edges 2, 4 are clearance faces 6, 7, which, in relation to the basic block-shaped form of the cutting tool 1, are placed diagonally in a way that produces a sufficient clearance angle during end-cut or longitudinal turning. A chip-guiding rib or rib structure 8 on the topside 9 of the cutting tool 1 is designed as a U-shape or a curve, wherein the curve opening faces the major cutting edge 2. An end-cut or end chip space 10 is formed between the chip-guiding rib 8 and the major cutting edge 2, whereas a longitudinal-turning or side chip space 11 is formed each time between the chip-guiding rib 8 and the minor cutting edges 4. The end-cut chip space 10 tapers toward the back, i.e., in the direction of the clamping rib 3, so that the width of the chips that are formed at the major cutting edge 2, during the chip-breaking at the chip-guiding rib 8, is reduced. Between the ends 12 of the U-shaped chip-guiding rib 8 and the outer corners 5, there is in each instance a corner chip-breaker 13 that divides the end-cut chip spaces 10 from one of the longitudinal-turning chip spaces 11. Each corner chip-breaker 13 has a curved shape that fits the contour of the outer corner 5. Particularly for small cut depths of, for example, less than one-tenth of a millimeter, the corner chip-breaker 13, which in this embodiment is designed as a chip-breaking trough, makes defined chip formation possible during both end-cut and longitudinal turning operations.

In the case of greater cut depths, the effects of the corner chip-breaker 13 and the chip-guiding rib 8 complement each other. Particularly during the removal of soft materials, an edge 15 that is formed between a flat surface 14, which runs in the longitudinal direction of the cutting tool 1 and borders on the clamping rib 3, and the longitudinal-turning chip space 11 is useful as a chip-guiding stage. Also useful for chip-breaking is a cross rib 16 that is arranged between the curved chip-guiding rib 8 and a flank 17 of the clamping rib 3, wherein a flush bridge exists between the chip-guiding rib 8 and the cross rib 16.

Figure 2B:
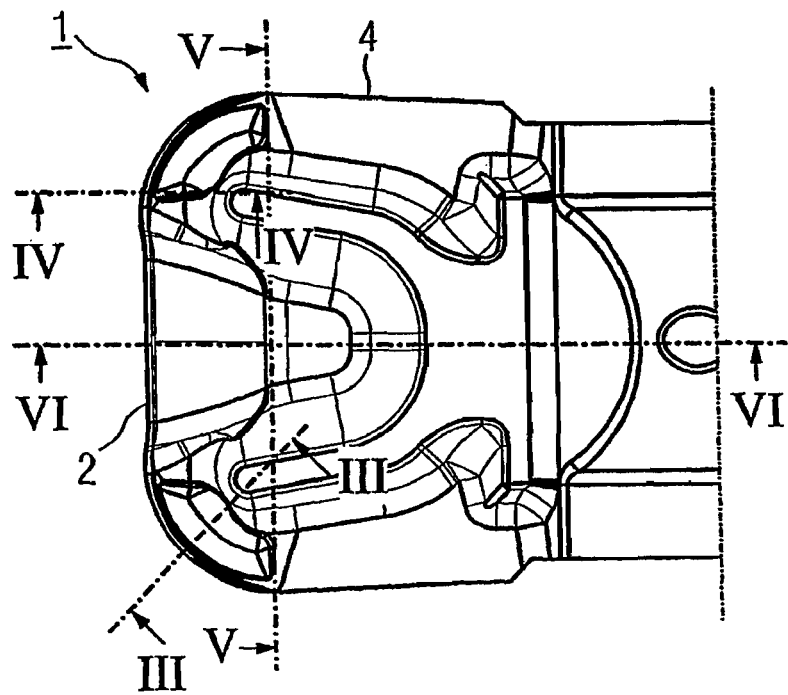

The chip-breaking and chip-guiding structures of the cutting tool 1 can be seen in more detail in FIGS. 2a, 2b, as well as in the sectional drawings according to FIGS. 3 to 6. For purposes of clarity, characteristic dimensions are shown in FIG. 2a, whereas the different cutting lines are shown in FIG. 2b. The chip-guiding rib 8 has a depth L1 that is measured from the major cutting edge 2, as well as a distance L2 from the major cutting edge 2. The depth L1 amounts to at least double, and a maximum of five times, the distance L2. Half of the width of the cutting tool 1, corresponding to the distance of each minor cutting edge 4 from a symmetry line S running longitudinally along the cutting tool 1, is designated as a half-width L6. The width of each corner chip-breaker 13, crosswise to the cutting tool 1, i.e., measured in the direction of the extension of the major cutting edge 2, is designated with L7. The ratio between the width L7 of the corner chip-breaker 13 and the half-width L6 of the major cutting edge 2 lies between 0.3 and 0.6, especially at 0.45. The corner chip-breakers 13 are, in each instance, designed as curved chip-breaking troughs (as in the top view), which are spaced only a short distance from the outer corners 5 and from the ends 12 of the chip-guiding rib 8. The distance of the end 12 of the chip-guiding rib 8 from the outer corner 5, which is measured diagonally to the major cutting edge 2, is designated with L3 and amounts to somewhat less than the distance L2 of the end 12 of the chip-guiding rib 8 from the major cutting edge 2, which is measured in the lengthwise direction of the cutting tool 1. The cross rib 16, which is connected to the side of the chip-guiding rib 8 that faces away from the major cutting edge 2 and which extends crosswise to the minor cutting edges 4, has a width of L9; and the clamping rib 3 connected to it has a width of L8. In the central section of the cutting tool 1 in which the clamping rib 3 is arranged, this cutting tool is basically tapered in the normal way, in contrast to the front area in which the cutting edges 2, 4 are arranged.

Figure 3:
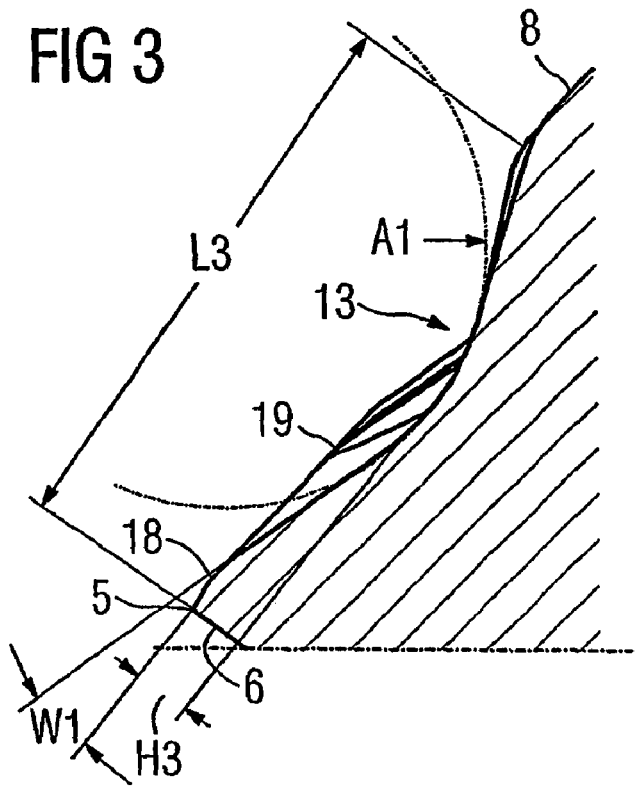
FIGS. 3 to 6 show different sectional drawings of the cutting tool according to FIG. 1.
Figure 4:
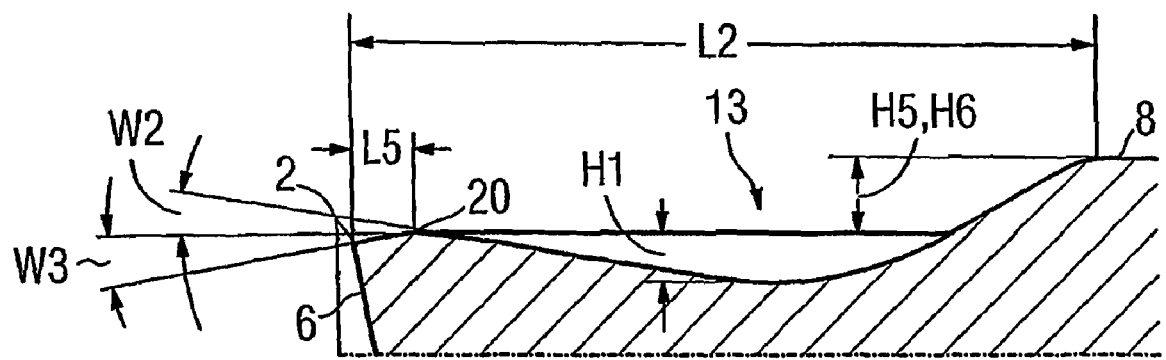

FIGS. 3 and 4 each show a sectional drawing in the lengthwise direction of the cutting tool 1 or respectively in the diagonal direction through the corner chip-breaker 13 that is designed as the depression positioned in front of the chip-guiding rib 8. The vertical extension of the corner chip-breaker 13, measured perpendicular to the plane clamped by of the cutting edges 2, 4, is designated as heights H3, H4 in both sectional drawings and is equally large in both cases. On the end 12 of the chip-guiding rib 8 that forms a chip curler, this rib has a height H5, measured in relation to the surrounding level of the longitudinal-turning chip space 11, that corresponds to the height H6 of the cross rib 16. In the cross-sectional view, the corner chip-breaker 13 has a concave surface, wherein, in the diagonal section, there is a curved depression with a radius of A1. The angle—which is formed at one of the kink sites 18 spaced a very short distance from the outer corner 5, between the cutting face 19 that runs horizontally up to this point and the path, which begins here, of the corner chip-breaker 13 that is designed as a chip-breaking trough—is designated in the diagonal sectional drawing as the first angle W1 and amounts to ca. 10° to 15°.

In the case of the sectional drawing in the lengthwise direction of the cutting tool 1, the corresponding angle that is formed at a kink site 20, which is spaced very close to the major cutting edge 2, is designated as the second angle W2 and amounts to ca. 7° to 12°, approximately three-fourths of the first angle W1. The cutting face between the major cutting edge 2 and the kink site 20 does not run horizontally, which would correspond to the position of the minor cutting edges 4, but is rather kinked down around a third angle W3 of 0° to 15°. The distance between the kink site 20, that is, between the edge of the corner chip-breaker 13 and the major cutting edge 2, is designated with L5.

Figure 5:
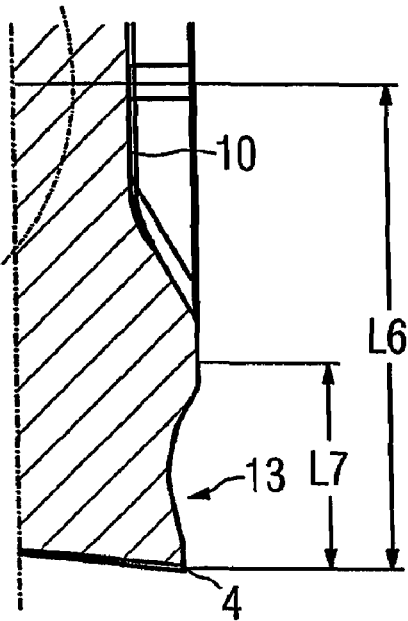
Figure 6:
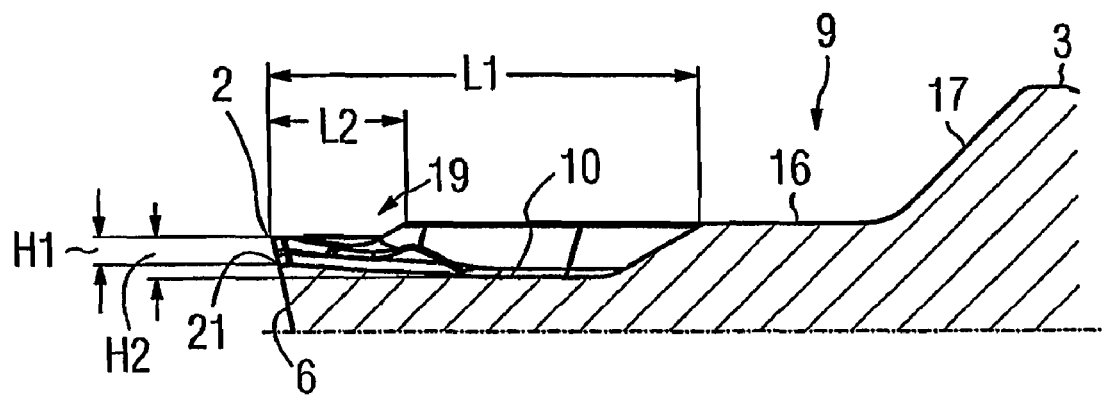
Figure 8A:
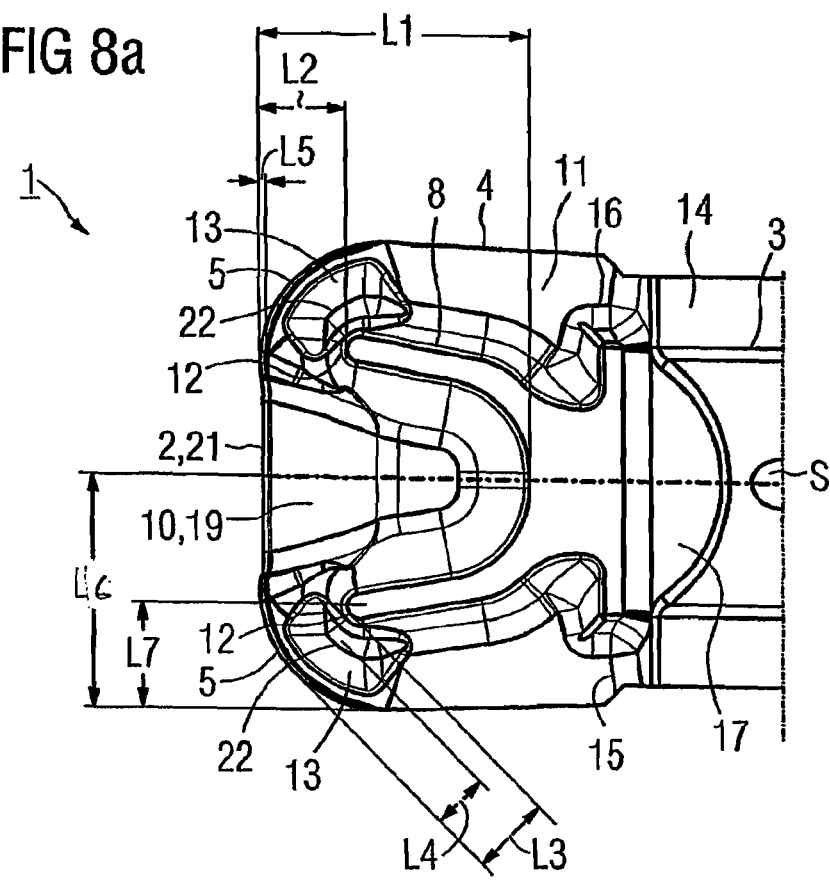
FIGS. 8a and 8b show a partial top view onto the cutting vice according to FIG. 7.
Figure 8B:
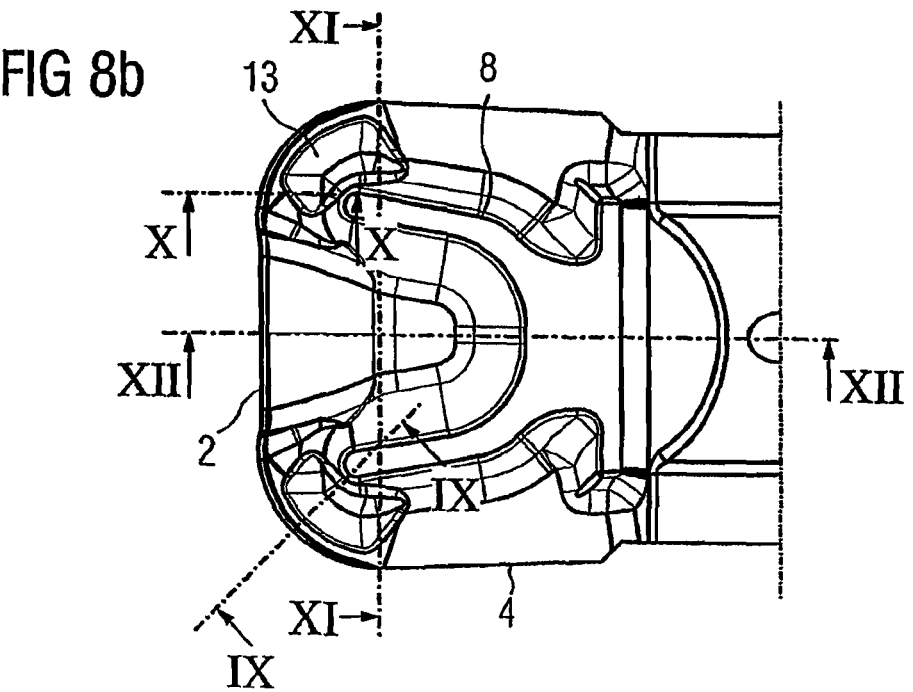

The shape of the end-cut chip space 10 can be seen more clearly in FIGS. 5 and 6. The end-cut chip space 10 extends from a central section 21 of the major cutting edge 2 (see FIG. 1 and FIGS. 2a, 2b), which, in relation to the outer corners 5, is depressed by a recess H1. The end-cut chip space 10 slopes down in the direction of the clamping rib 3, wherein a maximum depression H2, related to the level of the outer corners 5, is approximately fifty percent larger than the recess H1.

Figure 9:
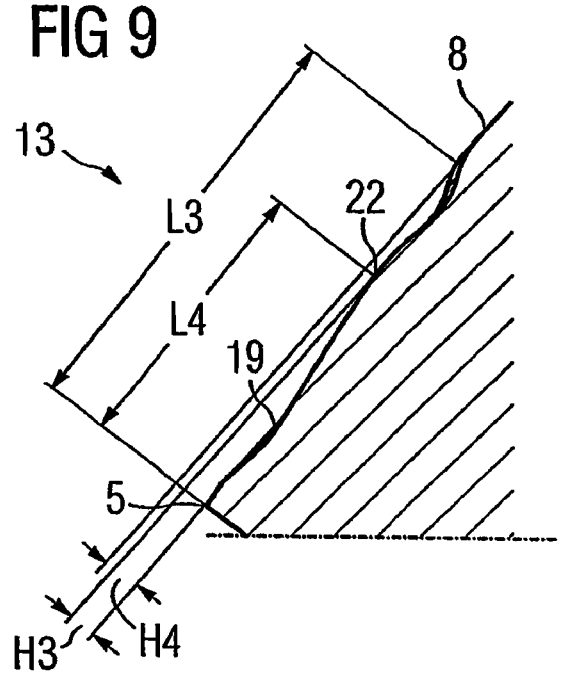
FIGS. 9 to 12 show different sectional drawings of the cutting tool according to FIG. 7.
Figure 10:
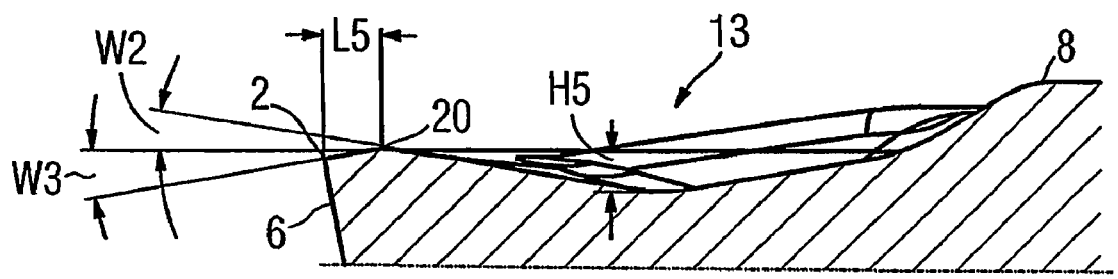
Figure 11:
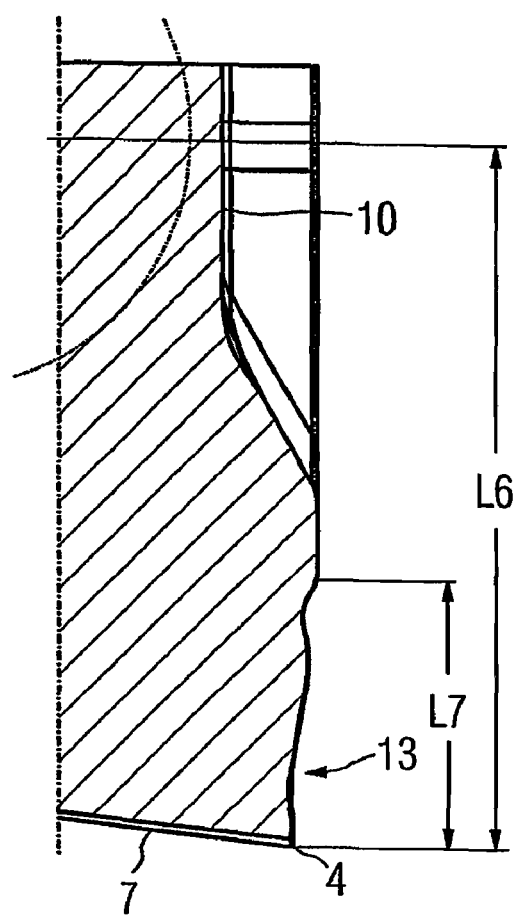
Figure 12:
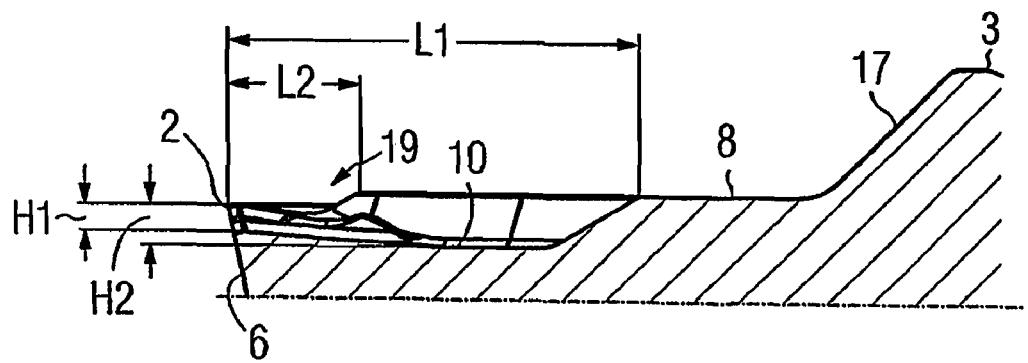

Another embodiment is shown in FIGS. 7 to 12, in views analogous to FIGS. 1 to 6. This embodiment distinguishes itself from the previously explained one primarily in that the corner chip-breakers 13 are not designed as chip-breaking troughs, but rather as chip-breaking high spots. Their highest situated crest line 22, as is seen particularly in the diagonal sectional drawing according to FIG. 9, is clearly offset from the chip-guiding rib 8 and exhibits a distance L4 from the outer corner 5. The height H3 of the corner chip-breaker 13 amounts to ca. 50% to 80% of the height H4 of the chip-guiding rib 8. The corner chip-breaker begins to function especially at very low cutting depths and thus provides for a defined chip formation in all operating methods of the cutting tool 1.

FIGS. 13a and 13b and 14a and 14b show details of an additional exemplary embodiment of a cutting tool 1 for end-cut and longitudinal turning. The corner chip-breaker in this case, analogous to the one in the exemplary embodiment illustrated in FIGS. 1 to 6, realized in the form of a chip-breaker trough, although it is elongated both toward the major cutting edge 2 and toward the minor cutting edge 4. The middle segment of the corner chip-breaker 13 is designated the curved segment 23 and has an outside radius designated R2 which is a minimum of 80% and a maximum of 95% of the radius R1 of the outer corner 24 that connects the major cutting edge 2 with the minor cutting edge 4 in the vicinity of the outer corner 5. The elongated portions of the corner chip-breaker 13 toward the minor cutting edge 4 and toward the major cutting edge 2 are designated the first linear segment 25 and the second linear segment 26 respectively, and are shown in broken lines in FIGS. 13a and 13b. There are preferably no edges, corners or steps between the central curved segment 23 of the corner chip-breaker 13 and the contiguous linear segments 25, 26.

The minor cutting edge 4 encloses with the major cutting edge 2 an angle A of approximately 90 degrees. The complementary angle (180°—A) is designated Angle B and indicates the angle by which the corner cutting edge 24 is curved. The section illustrated in FIG. 14 shows the cross section of the corner chip-breaker 13 in the vicinity of the line that bisects the angle between the cutting edges 2, 4. The curved segment 23 of the corner chip-breaker 13 is virtually divided by this bisector into a first chip-breaker segment 27 that faces the major cutting edge 2 and a second chip-breaker segment 28 that faces the minor cutting edge 4. Each of the chip-breaker segments 27, 28 extends over an angle C and D respectively, which is a minimum of one-quarter and a maximum of one-half of the angle B described by the corner cutting edge 24, as indicated in FIG. 13a by the angular indications Cmin, Cmax and Dmin, Dmax respectively.

The width of the corner chip-breaker 13 decreases, measured perpendicular to the respective neighboring cutting edges 2, 4, 24, from the first chip-breaker segment 27 to the second chip-breaker segment 28. The linear segments 25, 26 are contiguous without any sudden change of width to the central chip-breaker segments 27, 28, so that the second linear segment 26 that is next to the major cutting edge 2 is wider than the first linear segment 25 that faces the minor cutting edge 4. The lengths designated E and F of the two linear segments 25, 26 respectively are equal in the illustrated exemplary embodiment, and less than 50% of the radius R1 of the corner cutting edge 24.

The depth of the corner chip-breaker 13 decreases, as shown by a comparison of FIGS. 14a and 14b, from inside to outside, i.e. from the curved segment 23 to the linear segments 25, 26. In each area of the corner chip-breaker 13, the part of its surface that faces the respective neighboring cutting edge 2, 4, 24, to create a trough-like depression, is inclined relative to a plane that is defined by the position of the cutting edges 2, 4, 24. The angle of inclination is designated the flank angle G1, G2. The flank angle G2, in the middle of the curved segment 23, i.e. in the vicinity of the bisecting line, equals 1.5 to 2 times the flank angle G1 in the vicinity of the linear segments 25, 26. The support of the chip formation by the corner chip breaker 13 is therefore particularly pronounced on the outer corner 5.

One feature or aspect of an embodiment is believed at the time of the filing of this patent application to possibly reside broadly in a Cutting tool, particularly for end-cut and longitudinal turning, with one major cutting edge, on each of the two ends of which a minor cutting edge is attached by means of an outer corner, and with an end-cut chip space associated with the major cutting edge, as well as with longitudinal-turning chip spaces associated with each of the minor cutting edges and with chip curlers that are attached to the end-cut chip space, or respectively to the longitudinal-turning chip spaces, and that form a part of the flanks of a chip-guiding rib that is designed as a curve, with the curve opening facing the major cutting edge, characterized in that between each of the outer corners and the ends of the chip-guiding rib, there is an additional corner chip-breaker which fills the space between the ends of the chip guiding rib and the outer corners.

Another feature or aspect of an embodiment is believed at the time of the filing of this patent application to possibly reside broadly in a cutting tool, characterized in that the corner chip-breaker has a chip-breaking trough.

Yet another feature or aspect of an embodiment is believed at the time of the filing of this patent application to possibly reside broadly in a cutting tool, characterized in that the corner chip-breaker has a chip-breaking high spot.

Still another feature or aspect of an embodiment is believed at the time of the filing of this patent application to possibly reside broadly in a cutting tool, characterized in that the corner chip-breaker is designed as a curve, with the curve opening facing the adjoining ends of the chip-guiding rib.

A further feature or aspect of an embodiment is believed at the time of the filing of this patent application to possibly reside broadly in a cutting tool, characterized in that the corner chip-breaker has a curved segment, the outside radius of which equals at least 80% of the radius of the corner cutting edge that connects a minor cutting edge with the major cutting edge.

Another feature or aspect of an embodiment is believed at the time of the filing of this patent application to possibly reside broadly in a cutting tool, characterized in that the corner chip-breaker has a curved segment, the outside radius of which is a maximum of 95% of the radius of the corner cutting edge that connects a minor cutting edge with the major cutting edge.

Yet another feature or aspect of an embodiment is believed at the time of the filing of this patent application to possibly reside broadly in a cutting tool, characterized in that the curved segment of the corner chip-breaker has a first chip-breaker segment that faces the major cutting edge and a second chip-breaker segment that faces a minor cutting edge.

Still another feature or aspect of an embodiment is believed at the time of the filing of this patent application to possibly reside broadly in a cutting tool, characterized in that the width of the curved segment of the corner chip-breaker, measured perpendicular to the cutting edge, decreases from the first chip-breaker segment to the second chip-breaker segment.

A further feature or aspect of an embodiment is believed at the time of the filing of this patent application to possibly reside broadly in a cutting tool, characterized in that a chip-breaker segment extends over an angle that is at least one-quarter of the angle described by the corner cutting edge.

Another feature or aspect of an embodiment is believed at the time of the filing of this patent application to possibly reside broadly in a cutting tool, characterized in that a chip-breaker segment extends over an angle that is a maximum of one-half of the angle described by the corner cutting edge.

Yet another feature or aspect of an embodiment is believed at the time of the filing of this patent application to possibly reside broadly in a cutting tool, characterized in that the corner chip-breaker has a first linear segment that is contiguous to the curved segment and extends in the direction of a minor cutting edge.

Still another feature or aspect of an embodiment is believed at the time of the filing of this patent application to possibly reside broadly in a cutting tool, characterized in that the corner chip-breaker has a second linear segment that is contiguous to the curved segment and extends in the direction of the major cutting edge.

A further feature or aspect of an embodiment is believed at the time of the filing of this patent application to possibly reside broadly in a cutting tool, characterized in that the length of a linear segment is a maximum of one-half of the outside radius of the corner chip-breaker.

Another feature or aspect of an embodiment is believed at the time of the filing of this patent application to possibly reside broadly in a cutting tool, characterized in that the corner chip-breaker, in the vicinity of the curved segment, has a flank angle that is a minimum of 1.5 times the flank angle in the vicinity of a linear segment.

Yet another feature or aspect of an embodiment is believed at the time of the filing of this patent application to possibly reside broadly in a cutting tool, characterized in that the corner chip-breaker, in the vicinity of the curved segment, has a flank angle which is a maximum of twice the flank angle in the vicinity of a linear segment.

Still another feature or aspect of an embodiment is believed at the time of the filing of this patent application to possibly reside broadly in a cutting tool, characterized in that the major cutting edge exhibits a central section that is depressed in relation to the outer corners by a recess.

A further feature or aspect of an embodiment is believed at the time of the filing of this patent application to possibly reside broadly in a cutting tool, characterized in that the height of the corner chip-breaker is less than the recess of the central section of the major cutting edge.

Another feature or aspect of an embodiment is believed at the time of the filing of this patent application to possibly reside broadly in a cutting tool, characterized in that the height of the corner chip-breaker is not greater than the height of the chip-guiding rib.

Yet another feature or aspect of an embodiment is believed at the time of the filing of this patent application to possibly reside broadly in a cutting tool, characterized in that the width of the corner chip-breaker is at least 30% of the half-width of the major cutting edge.

Still another feature or aspect of an embodiment is believed at the time of the filing of this patent application to possibly reside broadly in a cutting tool, characterized in that the width of the corner chip-breaker is no more than 60% of the half-width of the major cutting edge.

A further feature or aspect of an embodiment is believed at the time of the filing of this patent application to possibly reside broadly in a cutting tool, characterized by a cross rib that is connected to the chip-guiding rib on the side facing away from the major cutting edge.

Another feature or aspect of an embodiment is believed at the time of the filing of this patent application to possibly reside broadly in a cutting tool, characterized in that the width of the cross rib is larger than the width of a clamping rib that is connected to it.

Yet another feature or aspect of an embodiment is believed at the time of the filing of this patent application to possibly reside broadly in a cutting tool, characterized in that the height of the cross rib corresponds to the height of the chip-guiding rib.

Still another feature or aspect of an embodiment is believed at the time of the filing of this patent application to possibly reside broadly in an end-cut and longitudinal turning and groove cutting tool comprising: an end cutting edge; a first side cutting edge and a second side cutting edge, each being disposed transverse to and adjacent opposite ends of said end cutting edge; a first outer corner being disposed to connect said end cutting edge and said first side cutting edge; a second outer corner being disposed to connect said end cutting edge with said second side cutting edge; a chip-guiding rib structure having a substantially curved shape that opens toward said end cutting edge; said chip-guiding rib structure comprising a first projecting portion and a second projecting portion; said first projecting portion being disposed to project substantially toward said first outer corner; said second projecting portion being disposed to project substantially toward said second outer corner; an end chip space being disposed adjacent to said end cutting edge and between said first and second projecting portions; a first side chip space being disposed adjacent to said first side cutting edge and said first projecting portion; a second side chip space being disposed adjacent to said second side cutting edge and said second projecting portion; chip curling surfaces being disposed between and to connect said chip-guiding rib and at least one of: said end chip space, and said first and second side chip spaces; a first additional corner chip-breaking trough being disposed between said first outer corner and an end of said first projection of said chip-guiding rib structure; and a second additional corner chip-breaking trough being disposed between said second outer corner and an end of said second projection of said chip-guiding rib structure.

A further feature or aspect of an embodiment is believed at the time of the filing of this patent application to possibly reside broadly in the cutting tool, wherein each said corner chip-breaking trough comprises a chip-breaking high spot.

Another feature or aspect of an embodiment is believed at the time of the filing of this patent application to possibly reside broadly in the cutting tool, wherein: each said corner chip-breaking trough has a substantially curved shape that opens facing the end of its corresponding projecting portion of said chip-guiding rib structure; each said outer corner comprises a curved corner cutting edge having a radius; each said corner chip breaker comprises a curved perimeter segment having a radius and being disposed adjacent to said curved corner cutting edge; and said radius of said curved perimeter segment from at least 80% to at most 95% of the radius of said curved cutting edge.

Yet another feature or aspect of an embodiment is believed at the time of the filing of this patent application to possibly reside broadly in the cutting tool, wherein: said curved perimeter segment of each said corner chip breaker comprises a first curved perimeter segment disposed adjacent said end cutting edge and a second curved perimeter segment disposed adjacent its corresponding side cutting edge; said curved perimeter segment having a length and a width, said length being greater than said width; said width decreases from said first curved perimeter segment to said second curved perimeter segment; said curved corner cutting edge defines an angle; each of said first curved perimeter segment and said second curved perimeter segment defines an angle; and said angle defined by at least one of said first curved perimeter segment and said second curved perimeter segment is from at least one-quarter to at most one-half of said angle defined by said curved corner cutting edge.

Still another feature or aspect of an embodiment is believed at the time of the filing of this patent application to possibly reside broadly in the cutting tool, wherein: each said corner chip-breaking trough comprises a first linear perimeter segment that is contiguous to said second curved perimeter segment and extends in the direction of its corresponding side cutting edge; each said corner chip-breaking trough comprises a second linear perimeter segment that is contiguous to said first curved perimeter segment and extends in the direction of said end cutting edge; each of said first and second linear perimeter segments has a length that is a maximum of one-half of said radius of said curved perimeter segment of each said corner chip-breaking trough; each said corner chip-breaking trough comprising a first longitudinal trough surface and a second longitudinal trough surface, each of which slope downwardly toward each other and meet at around the bottom center of said corner chip-breaking trough; said first longitudinal trough surface having a first slope at said curved perimeter segment and a second slope at at least one of said first and second linear perimeter segments; said first slope and a plane defined by at least one of said end cutting edge and a corresponding side cutting edge together define a flank angle (G2); said second slope and a plane defined by a corresponding side cutting edge together define a flank angle (G1); and said flank angle (G2) is a minimum of 1.5 times and a maximum of two times the flank angle (G1).

A further feature or aspect of an embodiment is believed at the time of the filing of this patent application to possibly reside broadly in the cutting tool, wherein: said end cutting edge comprises a central section that is depressed in relation to said outer corners by a recess (H1); each said corner chip-breaking trough has a height (H3) which is less than the recess (H1); the height (H3) is not greater than a height (H5) of said chip-guiding rib structure; a width (L7) of each said corner chip-breaking trough is at least 30% and no more than 60% of a half-width (L6) of said end cutting edge; said cutting tool comprises a cross rib connected to said chip-guiding rib structure on a side facing away from said end cutting edge; said cutting tool comprises a clamping rib configured to permit clamping of said cutting tool in a tool holder; said clamping rib is disposed adjacent and connected to said cross rib; a width (L9) of said cross rib is larger than a width (L8) of said clamping rib; and a height (H6) of said cross rib corresponds to the height (H5) of said chip-guiding rib structure.

A cutting tool, particularly for end-cut and longitudinal turning, has a major cutting edge, on each of the two ends of which a minor cutting edge is attached, as well as an end-cut chip space allocated to the major cutting edge and longitudinal-turning chip spaces allocated to each of the minor cutting edges. Chip curlers are attached to the end-cut chip space, or respectively to the longitudinal-turning chip spaces, and form a part of the flanks of a chip-guiding rib that is designed as a curve, with the curve opening facing the major cutting edge. Between the outer corners, which are formed between the major cutting edge and the minor cutting edges, and the ends of the chip-guiding rib, a corner chip-breaker is formed each time.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The corresponding foreign and international patent publication applications, namely, Federal Republic of Germany Patent Application No. 103 44 961.2, filed on Sep. 27, 2003, having inventor Franz Havrda, and DE-OS 103 44 961.2 and DE-PS 103 44 961.2, and International Application No. PCT/EP2004/010588, filed on Sep. 22, 2004, having WIPO Publication No. WO2005/035173 and inventor Franz Havrda, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

| AT LEAST PARTIAL LIST OF TERMS | |
|---|---|
| 1 | cutting tool |
| 2 | major cutting edge |
| 3 | clamping rib |
| 4 | minor cutting edge |
| 5 | outer corner |
| 6 | clearance face |
| 7 | clearance face |
| 8 | chip-guiding rib |
| 9 | top surface |
| 10 | end-cut chip space |
| 11 | longitudinal-turning chip space |
| 12 | end of the chip-guiding rib |
| 13 | corner chip-breaker |
| 14 | surface |
| 15 | edge |
| 16 | cross rib |
| 17 | flank |
| 18 | kink site |
| 19 | cutting face |
| 20 | kink site |
| 21 | central section |
| 22 | crest line |
| A1 | radius |
| H1 | recess |
| H2 | depression |
| H3 | height |
| H4 | height |
| H5 | height |
| L1 | depth |
| L2 | distance |
| L3 | distance |

-continued

| AT LEAST PARTIAL LIST OF TERMS | |
|---|---|
| L4 | distance |
| L5 | distance |
| L6 | half-width |
| L7 | width |
| L8 | width |
| L9 | width |
| S | symmetry line |
| W1 | angle |
| W2 | angle |
| W3 | angle |

What is claimed is:

1. An end-cut and longitudinal turning and groove cutting tool comprising:
   an end cutting edge;
   a first side cutting edge and a second side cutting edge, each being disposed transverse to and adjacent opposite ends of said end cutting edge;
   a first outer corner being disposed to connect said end cutting edge and said first side cutting edge;
   a second outer corner being disposed to connect said end cutting edge with said second side cutting edge;
   a chip-guiding rib structure having a substantially curved shape that opens toward said end cutting edge;
   said chip-guiding rib structure comprising a first projecting portion and a second projecting portion;
   said first projecting portion being disposed to project substantially toward said first outer corner;
   said second projecting portion being disposed to project substantially toward said second outer corner;
   an end chip space being disposed adjacent to said end cutting edge and between said first and second projecting portions;
   a first side chip space being disposed adjacent to said first side cutting edge and said first projecting portion;
   a second side chip space being disposed adjacent to said second side cutting edge and said second projecting portion;
   said chip-guiding rib structure comprising a top surface and flank surfaces extending from said top surface to said chip spaces;
   at least a portion of said flank surfaces comprising chip curling surfaces being disposed between said top surface of said chip-guiding rib and each of: said end chip space and said first and second side chip spaces;
   additionally, a first corner chip-breaking trough being disposed between said first outer corner and an end of said first projection of said chip-guiding rib structure; and
   additionally, a second corner chip-breaking trough being disposed between said second outer corner and an end of said second projection of said chip-guiding rib structure.

2. The cutting tool according to claim 1, wherein:
   each of said corner chip-breaking troughs comprises a perimeter edge portion surrounding a substantial portion of said corner chip-breaking trough;
   each of said corner chip-breaking troughs comprises inclined surface portions extending from said perimeter edge portion toward a central portion of said corner chip-breaking trough; and
   said inclined surface portions of said corner chip-breaking troughs have a substantially different inclination than the inclination of surfaces disposed about said perimeter edge portion.

3. The cutting tool according to claim 2, wherein:

said perimeter edge portion of each said corner chip-breaking trough has a substantially curved shape that opens facing the end of its corresponding projecting portion of said chip-guiding rib structure;

each said outer corner comprises a curved corner cutting edge having a radius;

said perimeter edge portion comprises a curved perimeter segment having a radius and being disposed adjacent to said curved corner cutting edge; and said radius of said curved perimeter segment is from at least 80% to at most 95% of the radius of said curved cutting edge.

4. The cutting tool according to claim 3, wherein:

said curved perimeter segment of each said corner chip breaker comprises a first curved perimeter segment disposed adjacent said end cutting edge and a second curved perimeter segment disposed adjacent its corresponding side cutting edge;

said curved perimeter segment having a length and a width, said length being greater than said width;

said width decreases from said first curved perimeter segment to said second curved perimeter segment;

said curved corner cutting edge defines an angle;

each of said first curved perimeter segment and said second curved perimeter segment defines an angle; and said angle defined by at least one of said first curved perimeter segment and said second curved perimeter segment is from at least one-quarter to at most one-half of said angle defined by said curved corner cutting edge.

5. The cutting tool according to claim 4, wherein:

each said corner chip-breaking trough comprises a first linear perimeter segment that is contiguous to said second curved perimeter segment and extends in the direction of its corresponding side cutting edge;

each said corner chip-breaking trough comprises a second linear perimeter segment that is contiguous to said first curved perimeter segment and extends in the direction of said end cutting edge;

each of said first and second linear perimeter segments has a length that is a maximum of one-half of said radius of said curved perimeter segment of each said corner chip-breaking trough;

each said corner chip-breaking trough comprising a first longitudinal trough surface and a second longitudinal trough surface, each of which slope downwardly toward each other and meet at around the bottom center of said corner chip-breaking trough;

said first longitudinal trough surface having a first slope at said curved perimeter segment and a second slope at least one of said first and second linear perimeter segments;

said first slope and a plane defined by at least one of said end cutting edge and a corresponding side cutting edge together define a flank angle (G2);

said second slope and a plane defined by a corresponding side cutting edge together define a flank angle (G1); and said flank angle (G2) is a minimum of 1.5 times and a maximum of two times the flank angle (G1).

6. The cutting tool according to claim 5, wherein:

said end cutting edge comprises a central section that is depressed in relation to said outer corners by a recess (H1);

each said corner chip-breaking trough has a height (H3) which is less than the recess (H1);

the height (H3) is not greater than a height (H5) of said chip-guiding rib structure;

a width (L7) of each said corner chip-breaking trough is at least 30% and no more than 60% of a half-width (L6) of said end cutting edge;

said cutting tool comprises a cross rib connected to said chip-guiding rib structure on a side facing away from said end cutting edge;

said cutting tool comprises a clamping rib configured to permit clamping of said cutting tool in a tool holder;

said clamping rib is disposed adjacent and connected to said cross rib;

a width (L9) of said cross rib is larger than a width (L8) of said clamping rib; and a height (H6) of said cross rib corresponds to the height (H5) of said chip-guiding rib structure.

7. A cutting tool comprising:

an end cutting edge;

a first side cutting edge and a second side cutting edge, each being disposed transverse to and adjacent opposite ends of said end cutting edge;

a first outer corner being disposed to connect said end cutting edge and said first side cutting edge;

a second outer corner being disposed to connect said end cutting edge with said second side cutting edge;

a chip-guiding rib structure having a substantially curved shape that opens toward said end cutting edge;

said chip-guiding rib structure comprising a first projecting portion and a second projecting portion;

said first projecting portion being disposed to project substantially toward said first outer corner;

said second projecting portion being disposed to project substantially toward said second outer corner;

an end chip space being disposed adjacent to said end cutting edge and between said first and second projecting portions;

a first side chip space being disposed adjacent to said first side cutting edge and said first projecting portion;

a second side chip space being disposed adjacent to said second side cutting edge and said second projecting portion;

additionally, a first corner chip-breaking trough being disposed between said first outer corner and an end of said first projection of said chip-guiding rib structure; and additionally, a second corner chip-breaking trough being disposed between said second outer corner and an end of said second projection of said chip-guiding rib structure.

8. The cutting tool according to claim 7, wherein:

each of said corner chip-breaking troughs comprises a perimeter edge portion surrounding a substantial portion of said corner chip-breaking trough;

each of said corner chip-breaking troughs comprises inclined surface portions extending from said perimeter edge portion toward a central portion of said corner chip-breaking trough; and said inclined surface portions of said corner chip-breaking troughs have a different inclination than the inclination of surfaces disposed about said perimeter edge portion.

9. The cutting tool according to claim 8, wherein:

said perimeter edge portion of each said corner chip-breaking trough has a substantially curved shape that opens facing the end of its corresponding projecting portion of said chip-guiding rib structure;

each said outer corner comprises a curved corner cutting edge having a radius;

each said corner chip breaker comprises a curved perimeter segment having a radius and being disposed adjacent to said curved corner cutting edge; and said radius of said curved perimeter segment from at least 80% to at most 95% of the radius of said curved cutting edge.

10. The cutting tool according to claim 9, wherein:

said curved perimeter segment of each said corner chip breaker comprises a first curved perimeter segment disposed adjacent said end cutting edge and a second curved perimeter segment disposed adjacent its corresponding side cutting edge;

said curved perimeter segment having a length and a width, said length being greater than said width;

said width decreases from said first curved perimeter segment to said second curved perimeter segment;

said curved corner cutting edge defines an angle;

each of said first curved perimeter segment and said second curved perimeter segment defines an angle; and said angle defined by at least one of said first curved perimeter segment and said second curved perimeter segment is from at least one-quarter to at most one-half of said angle defined by said curved corner cutting edge.

11. The cutting tool according to claim 10, wherein:

each said corner chip-breaking trough comprises a first linear perimeter segment that is contiguous to said second curved perimeter segment and extends in the direction of its corresponding side cutting edge;

each said corner chip-breaking trough comprises a second linear perimeter segment that is contiguous to said first curved perimeter segment and extends in the direction of said end cutting edge;

each of said first and second linear perimeter segments has a length that is a maximum of one-half of said radius of said curved perimeter segment of each said corner chip-breaking trough;

each said corner chip-breaking trough comprising a first longitudinal trough surface and a second longitudinal trough surface, each of which slope downwardly toward each other and meet at around the bottom center of said corner chip-breaking trough;

said first longitudinal trough surface having a first slope at said curved perimeter segment and a second slope at least one of said first and second linear perimeter segments;

said first slope and a plane defined by at least one of said end cutting edge and a corresponding side cutting edge together define a flank angle (G2);

said second slope and a plane defined by a corresponding side cutting edge together define a flank angle (G1); and said flank angle (G2) is a minimum of 1.5 times and a maximum of two times the flank angle (G1).

12. The cutting tool according to claim 11, wherein:

said end cutting edge comprises a central section that is depressed in relation to said outer corners by a recess (H1);

each said corner chip-breaking trough has a height (H3) which is less than the recess (H1);

the height (H3) is not greater than a height (H5) of said chip-guiding rib structure;

a width (L7) of each said corner chip-breaking trough is at least 30% and no more than 60% of a half-width (L6) of said end cutting edge;

said cutting tool comprises a cross rib connected to said chip-guiding rib structure on a side facing away from said end cutting edge;

said cutting tool comprises a clamping rib configured to permit clamping of said cutting tool in a tool holder;

said clamping rib is disposed adjacent and connected to said cross rib;

a width (L9) of said cross rib is larger than a width (L8) of said clamping rib; and a height (H6) of said cross rib corresponds to the height (H5) of said chip-guiding rib structure.

* * * * *